O. FROM.
SAFETY HOOK.
APPLICATION FILED AUG. 23, 1915.

1,194,005.

Patented Aug. 8, 1916.

Witnesses
Charles L. Reynolds.
E. N. Hallgren

Inventor
Otto From
By Adams & Reynolds
Attorneys

UNITED STATES PATENT OFFICE.

OTTO FROM, OF ROCHESTER, WASHINGTON.

SAFETY-HOOK.

1,194,005.

Specification of Letters Patent.  Patented Aug. 8, 1916.

Application filed August 23, 1915. Serial No. 46,824.

*To all whom it may concern:*

Be it known that I, OTTO FROM, a subject of the Czar of Russia, and resident of Rochester, county of Thurston and State of Washington, have invented certain new and useful Improvements in Safety-Hooks, of which the following is a specification.

My invention relates to safety hooks and comprises certain novel features of construction which will be hereinafter described and particularly pointed out in the claims.

The object of my invention is to provide a means for closing the gap or mouth of a hook of such character that it will be impossible for any link or chain to be removed from the hook without breaking some part thereof, and to have such closing means so shaped that it will present a smooth exterior surface which will form a continuation of the exterior surface of the hook, thereby eliminating projections which would be liable to catch on objects past which the hook is drawn.

In the accompanying drawing I have shown my invention in the form of construction which is now preferred by me.

Figure 1:
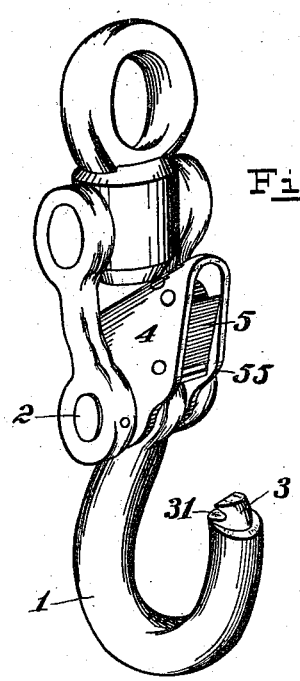
Figure 2:
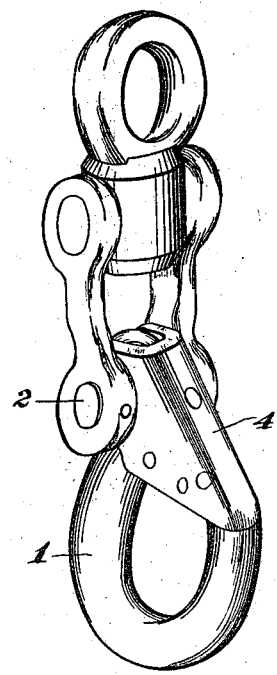
Figure 3:
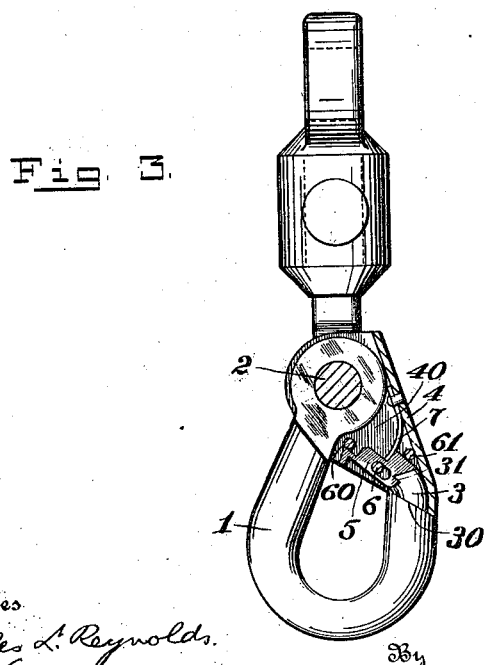

Figure 1 shows my hook in perspective with the securing device thrown backward or into opening position. Fig. 2 shows the same hook in perspective with the device closed. Fig. 3 is a side elevation with the hook closing parts in section, and Fig. 4 shows in perspective the sliding catch or locking member.

The hook 1, as herein shown, represents a type of hook which is in common use in logging operations. This shape has been shown simply because it is a common shape and not that my invention is in any sense limited to this type of hook. This hook is pivoted upon a pin 2 which passes through the eye thereof. The tip or point of the hook is provided with a section 3 which is reduced somewhat in size to form a shoulder 30, which extends across the sides and outer edge of the hook to form a seat for the reception of the end of the closing member 4.

The closing member 4 is made hollow, consisting of two sides and a connecting web, thus forming a cross section resembling in its general shape the letter U. This closing member is pivoted upon the pin 2 and is capable of swinging into the extreme positions shown in Figs. 1 and 2.

Figure 4:
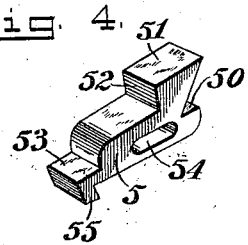

Within the hollow of the closing member 4 is mounted a catch block 5, which block is shown separately in Fig. 4. This block is provided with a slot 54, extending lengthwise therein and through which passes a pin 6. Pins 60 and 61, which connect opposite sides 40 of the closing member, engage respectively with surfaces 53 and 51 of the block 5.

These three pins form guides controlling the catch block 5 to cause it to reciprocate across the opening of the hook when the closing member is in locked position.

The catch block 5 has a projecting end or tooth 50, which is adapted to engage with a surface 31, which forms one side of a notch formed in the reduced tip 3 of the hook. The surface of the tooth 50 of the catch block and 31 of the hook extend substantially parallel with the direction of reciprocation of the catch block 5. In consequence, when the catch block is in its outermost position, or that shown in Fig. 3, the locking member 4 cannot be swung outwardly, or into the position to open the hook until the catch block 5 has been moved backward. The catch block is normally held outward by means of a spring 7, which is secured to the hollow locking member 4 and has its free end engaging the under surface of ledge 52 of the catch block. The catch block has a ledge 55 projecting toward the curve of the hook. The outer edge of this ledge is preferably coincident with the inner edge of the sides 40 of the locking member, or at least should not project beyond these edges as it is thus protected against accidental engagement of such character as would release the catch. When it is desired to release the catch it may be engaged by the finger to slide the block 5 backwardly. When the block is in opened position, swinging it to closed position causes the tip of the hook to engage the outer end of the catch block in such manner that the surfaces act as cams to force the catch block backward. It is automatically thrown out into engaged position as soon as it has been entirely closed.

The operation of this device is believed to be clear from the drawing and the description already given.

Having thus described my invention, what I claim as new, and desire to secure by Letters Patent of the United States of America, is:—

1. A safety hook comprising a hook and a guard member having a common pivot, the tip of said hook having a notch facing toward the pivot, said guard member being recessed and receiving the tip of the hook, a catch slidable in said recess toward and from the pivot transversely of the axis of the pull, and adapted to engage in said notch.

2. A safety hook comprising a hook, a guard member and a pivot common to both, the hook having a tip section reduced on its outer and side faces and having a notch at its inner side having its face nearest the throat of the hook lying in a plane which extends crosswise the throat opening, the guard member being recessed and receiving the tip of the hook, and a catch mounted in the recess of the guard member to reciprocate crosswise the throat and having a surface complemental to and engaging said side face of the notch in the hook tip to prevent swinging open of the guard.

3. A safety hook comprising a hook, a guard member formed of a plate bent in a substantially U shape, a common pivot for said guard and hook, the tip of said hook having a notch facing toward the pivot, a catch in the recess of said guard slidable toward and from said pivot transversely of the axis of pull, and adapted to engage in said notch, guides for said catch and a spring secured to said guard and bearing upon said catch to hold said catch in locked position.

4. A safety hook comprising a hook, a guard member formed of a plate bent in a substantially U shape, a common pivot for said guard and hook, the tip of said hook having a notch facing toward the pivot, a catch in the recess of said guard slidable toward and from said pivot transversely of the axis of the pull, and adapted to engage in said notch, guides for said catch, said guides acting as stops to limit the movement of said catch, and a spring secured to said guard and bearing upon said catch to hold said catch in locked position.

Signed at Rochester, Washington, this 14th day of August, 1915.

OTTO FROM.

Witness:
HERMAN JACOBSON.

Copies of this patent may be obtained for five cents each, by addressing the "Commissioner of Patents, Washington, D. C."